US008688430B1

(12) United States Patent
Bonebakker et al.

(10) Patent No.: US 8,688,430 B1
(45) Date of Patent: Apr. 1, 2014

(54) USING COMPUTATIONAL PHASES TO MODEL THE LOAD ON A COMPUTER SYSTEM

(75) Inventors: Lodewijk Bonebakker, Mountain View, CA (US); Ilya Sharapov, Sunnyvale, CA (US)

(73) Assignee: Oracle America, Inc., Redwood Shores, CA (US)

( * ) Notice: Subject to any disclaimer, the term of this patent is extended or adjusted under 35 U.S.C. 154(b) by 902 days.

(21) Appl. No.: 11/725,874

(22) Filed: Mar. 19, 2007

(51) Int. Cl.
 G06F 9/44 (2006.01)
 G06F 9/445 (2006.01)
 G06F 9/45 (2006.01)
 G06F 9/455 (2006.01)
 G06F 9/46 (2006.01)
 G06F 9/52 (2006.01)

(52) U.S. Cl.
 USPC .............................. 703/21; 703/22; 718/104

(58) Field of Classification Search
 USPC ................. 703/15, 22; 702/186; 709/201–203
 See application file for complete search history.

(56) References Cited

U.S. PATENT DOCUMENTS

| | | | | |
|---|---|---|---|---|
| 5,715,184 A * | 2/1998 | Tyler et al. | ...................... | 703/15 |
| 5,956,662 A * | 9/1999 | Hemker et al. | ............... | 702/182 |
| 6,721,941 B1 * | 4/2004 | Morshed et al. | ............... | 717/127 |
| 6,898,556 B2 * | 5/2005 | Smocha et al. | ............... | 702/186 |
| 2004/0006561 A1 * | 1/2004 | Nica | ................................. | 707/3 |

* cited by examiner

*Primary Examiner* — Suzanne Lo
(74) *Attorney, Agent, or Firm* — Park, Vaughan, Fleming & Dowler LLP

(57) ABSTRACT

Embodiments of the present invention provide a system that simulates a load on a computer system. The system starts by collecting a set of sampled values from one or more monitors in the computer system during the execution of program code. Next, the system uses the set of sampled values to determine if one or more repeating computational phases occurs during the execution of the program code. If one or more repeating computational phases occurs, the system subsequently simulates a load on the computer system by executing portions of the program code that caused each repeating computational phase one or more times.

21 Claims, 6 Drawing Sheets

USING COMPUTATIONAL PHASES TO MODEL THE LOAD ON A COMPUTER SYSTEM

BACKGROUND

1. Field of the Invention

Embodiments of the present invention relate to techniques for modeling workloads on computer systems. More specifically, embodiments of the present invention relate to a technique for using computational phases to model a workload on a computer system.

2. Related Art

Computer system designers commonly perform a considerable number of simulations to ensure that their new designs are capable of meeting the workload demands that will be placed on them. These simulations are often configured to model the performance of real workloads on the computer systems.

Hence, it is desirable to be able to both accurately and efficiently characterize real workloads in order to optimize computer system designs.

In the case of homogeneous workloads, this characterization can be accomplished using statistical averages of key system parameters, such as various cache miss rates or CPI (cycles-per-instruction) averages. For example, a homogeneous workload can arise from processing a steady stream of transactions on an online transaction processing (OLTP) system.

On the other hand, many workloads, in particular workloads arising from high-performance and technical computing applications, are not homogeneous and instead go through different computational "phases." For example, in domain decomposition problems, computational phases can include computations within a domain followed by a communication phase, wherein the results of the computations are exchanged between the computational elements.

At a coarser level, the computational phases can correspond to pre- and post-processing operations and the iterations in the main computational stage. Because of the dissimilarity of different computational phases, non-homogenous workloads can be difficult to characterize, which means that simulations of such non-homogeneous workloads are likely to be imprecise.

Hence, what is needed is a method and apparatus for characterizing workloads without the above-described problems.

SUMMARY

Embodiments of the present invention provide a system that generates a workload on a computer system. The system starts by collecting a set of sampled values from one or more monitors in the computer system during the execution of program code or workload. Next, the system uses the set of sampled values to determine if one or more repeating computational phases occurs during execution. If one or more repeating computational phases occurs, the system can subsequently simulate the workload on the computer system by executing those portions of the program code or workload that caused each repeating computational phase one or more times.

In some embodiments, the repeating computational phases are characterized by identifiable patterns in the sampled values.

In some embodiments, when determining if one or more repeating computational phases occurs during the execution of program code, the system generates a workload profile from the set of the sampled values, wherein the workload profile contains a sequence of vectors representing a sequence of sampled values from the set of sampled values. The system then compares two or more vectors to determine when a computational phase change occurs.

In some embodiments, when determining if one or more repeating computational phases occurs during the execution of program code, the system generates a workload profile from the set of the sampled values, wherein the workload profile contains a sequence of vectors representing a sequence of sampled values from the set of sampled values. The system then divides the workload profile into two or more intervals and compares each division of the workload profile to at least one other division of the workload profile to determine if the divisions have similar workload patterns. During this comparison, the system can use pattern matching analysis. If the system determines that the compared divisions have similar workload patterns, they likely represent the same computational phase.

In some embodiments, the system determines what portion of the program code is executing as each repeating computational phase occurs.

In some embodiments, the one or more monitors sample system metrics including: (1) the number of instructions executed per second; (2) the number of execution cycles per second; (3) the traffic on a bus in the computer system; (4) the load on a processor; (5) the miss-rate in a cache; or (6) another system metric that indicates an aspect of computer system performance.

In some embodiments, if no repeating computational phases are found using the sampled values, the system switches the monitors to sample different system metrics.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Computer System

Figure 1:
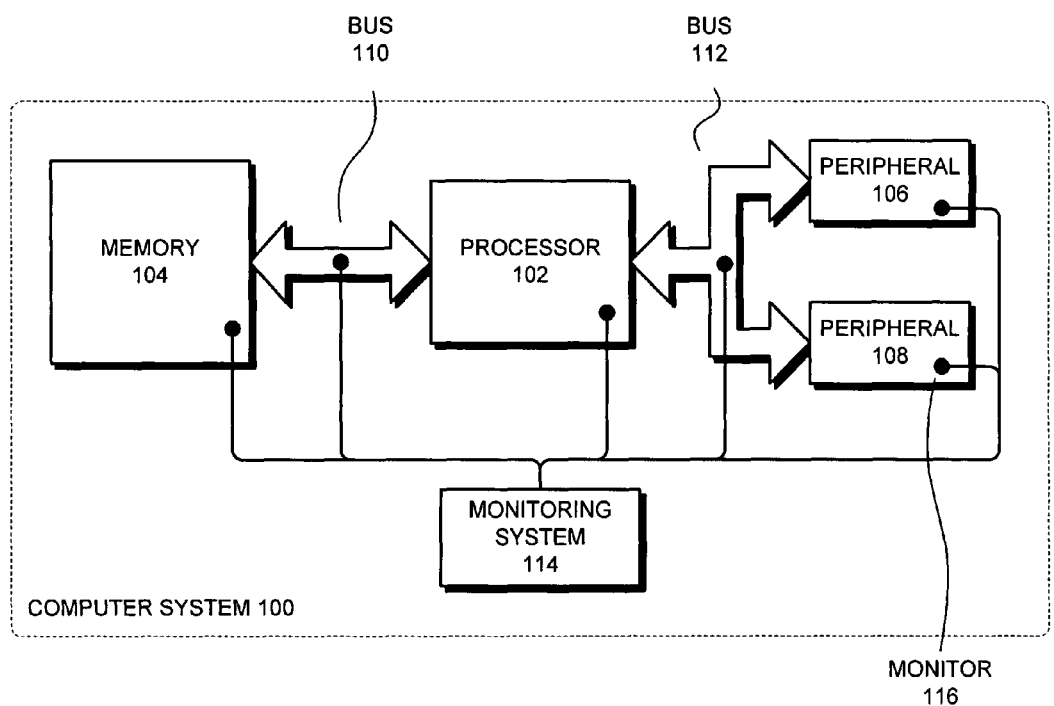
FIG. 1 illustrates a computer system in accordance with an embodiment of the present invention.

FIG. 1 illustrates computer system 100 in accordance with an embodiment of the present invention. Computer system 100 includes processor 102, memory 104, peripheral 106, and peripheral 108. Processor 102 can be any type of microprocessor that executes program code. Memory 104 is coupled to processor 102 through bus 110 and contains data and program code for processor 102. Bus 110 serves as a communication channel for data and program code between processor 102 and memory 104. Peripherals 106 and 108 can be any type of peripheral components, such as video cards, interface cards, or network cards. Bus 112 serves as a communication channel for data and commands between processor 102 and peripherals 106 and 108.

In embodiments of the present invention, computer system 100 includes monitoring system 114. Monitoring system 114 is coupled to a number of monitors 116 on components in computer system 100. Monitoring system 114 uses monitors 116 to sample system metrics, which can then be used to determine the performance of the associated components. For example, monitoring system 114 has a monitor 116 on peripheral 108. Through this monitor 116, monitoring system 114 can determine the current load on peripheral 108. In an alternative embodiment, one or more system metrics can be sampled values obtained from hardware counters within processor 102.

Computational Phases in a 3-Car Accident Simulation

FIGS. 2A-2D present graphs illustrating processor use during a three-car accident simulation in accordance with embodiments of the present invention. This three-car accident simulation is a detailed simulation of the effects of a theoretical automobile accident involving three vehicles and their passengers. The three-car accident simulation is one example of the "Finite Element Method"; a class of computer simulations that model the behavior of complex structural dynamic systems. For the purposes of illustration, we assume that the computer system running the simulation has a few dozen processors and the associated peripherals (RAM, hard drives, etc.) required to run such a simulation.

Note that although "processor use" is the metric used in FIGS. 2A-2D, the basic principle extends to other system metrics. For example, the system metric could be the traffic on a system bus, the instructions-per-second, the page file use, or any other system metric that is indicative of some aspect of the computer system's performance. Furthermore, the principle extends to combinations and derivatives of system metrics, such as instructions-per-second combined with cycles-per-second, which can be used to calculate cycles-per-instruction (CPI).

Figure 2A:
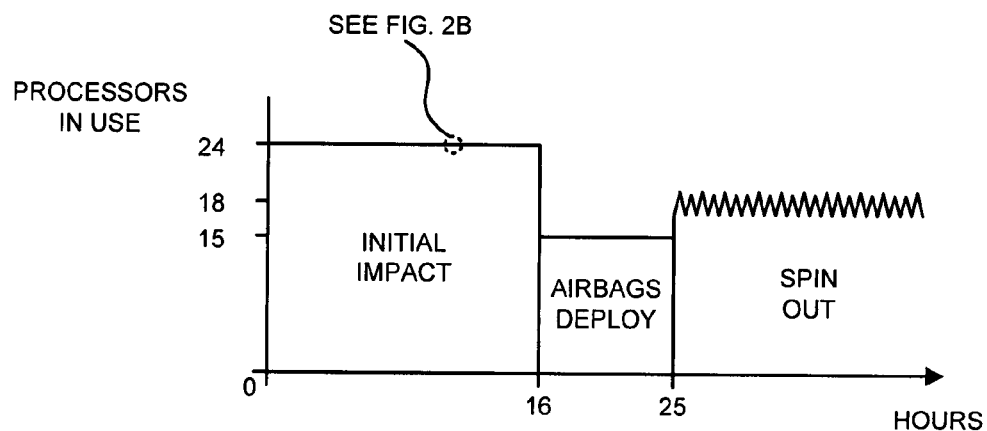
FIG. 2A presents a graph illustrating processor use during a three-car accident simulation in accordance with an embodiment of the present invention.

FIG. 2A presents a graph illustrating a high-level view of processor use during the three-car accident simulation. In FIG. 2A, the horizontal axis represents time, measured in hours, while the vertical axis represents processor use. As shown in FIG. 2A, there are several computational "phases" in the exemplary three-car accident simulation, including: (1) an "initial impact" phase in which the initial impact is modeled; (2) an "airbags deploy" phase in which the deployment of the airbags within the vehicles is modeled; and (3) a "spin out" phase in which the after-effects of the initial impact are modeled. The processor use in the computer system corresponds to each of the computational phases. For example, the computer system computes the effects of the "initial impact" in 16 hours using an average of 24 processors. For the next 9 hours, the system computes the deployment of the airbags in the vehicles, using an average of 15 processors. For the remaining time, the system computes the "spin out," which requires an average of approximately 18 processors.

Figure 2B:
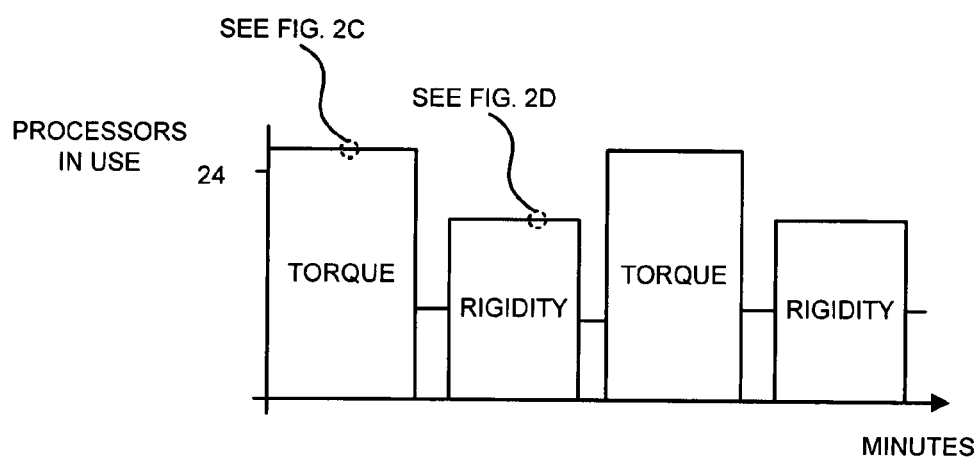
FIG. 2B presents a graph illustrating processor use during a three-car accident simulation in accordance with an embodiment of the present invention.

FIG. 2B presents a graph illustrating an expanded portion of the processor use pattern during the initial impact phase of FIG. 2A. In FIG. 2B, the horizontal axis represents time, measured in minutes, while the vertical axis represents processor use. The computations within the initial impact phase are seen as a repeating series of torque/rigidity/dynamics (TRD) computations. In other words, given an initial position, the computer system first computes the torque applied to the bodies (i.e., automobiles, passengers, etc.) in the simulation. The system then computes rigidity and dynamics for the bodies. Between each of these computational phases, there is a lull in processor use as the computer system stores the results of one computation and prepares for the next computation.

Figure 2C:
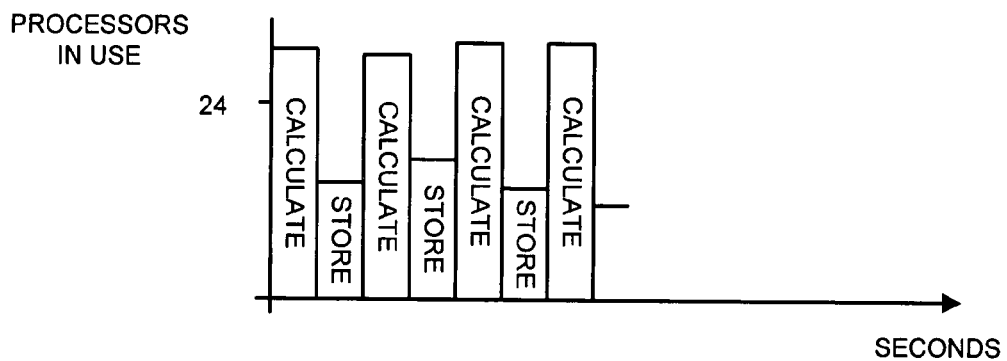
FIG. 2C presents a graph illustrating processor use during a three-car accident simulation in accordance with an embodiment of the present invention.

FIG. 2C presents a graph illustrating an expanded portion of the computation pattern during a torque phase of FIG. 2B. In FIG. 2C, the horizontal axis represents time, measured in seconds, while the vertical axis represents processor use. The computations within the torque phase are seen as a repeating series of computations interspersed with store operations. In other words, torque is computed for some portion of the accident simulation, then the results are stored and the required data is loaded for the computation of torque in the next portion of the accident simulation.

Figure 2D:
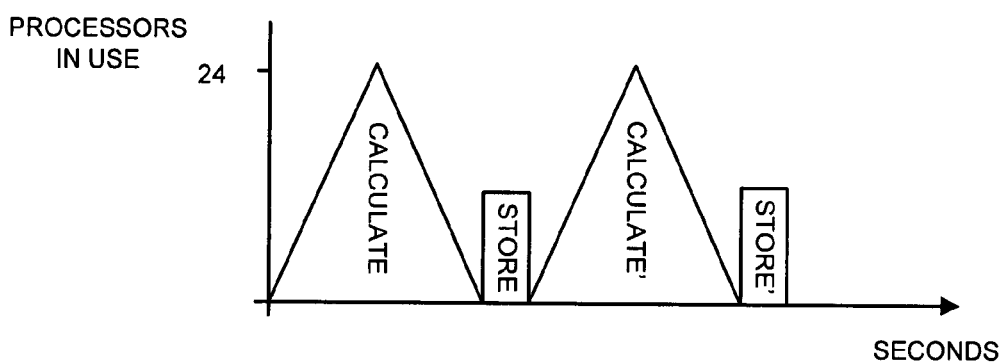
FIG. 2D presents a graph illustrating processor use during a three-car accident simulation in accordance with an embodiment of the present invention.

FIG. 2D presents a graph illustrating an expanded portion of the computation pattern during a rigidity phase of FIG. 2B. In FIG. 2D, the horizontal axis represents time, measured in seconds, while the vertical axis represents processor use. The computations within the rigidity phase are seen as a repeating series of computations interspersed with store operations. In other words, rigidity is computed for some portion of the accident simulation, then the results are stored and the required data is loaded for the computation of rigidity in the next portion of the accident simulation.

The torque computation (see FIG. 2C) differs from the rigidity computation in that during the torque computation, the computer system very rapidly reaches the maximum processor use level and maintains that level throughout the computation, while during the rigidity computation the computer system is comparatively slow to reach the maximum processor use level and maintains the maximum processor use level for a very short time before trailing off.

Although no graph is presented, we assume that the computational pattern for the dynamics phase is similar to the computational pattern for the torque and rigidity phases. That is, the dynamics phase, like the torque and rigidity phases, can be decomposed into a series of identifiable repeating computations.

Because each of the torque, rigidity, and dynamics phases can be decomposed into a series of repeating computations, the typical processor use when computing simulation results for one of these phases can be modeled by simulating one (or a small number) of the repeating computations corresponding to the computational phase. By modeling the processor use in the computer system using these repeating computations, a system designer can avoid the need to simulate the full computational phase.

Furthermore, at a higher computational phase level, a system designer can simulate the processor use during the entire "initial impact" phase by simulating one (or a small number) of repeating computations in each of the torque, rigidity, and dynamics computational phases.

Determining a Computational Phase Change

Figure 3:
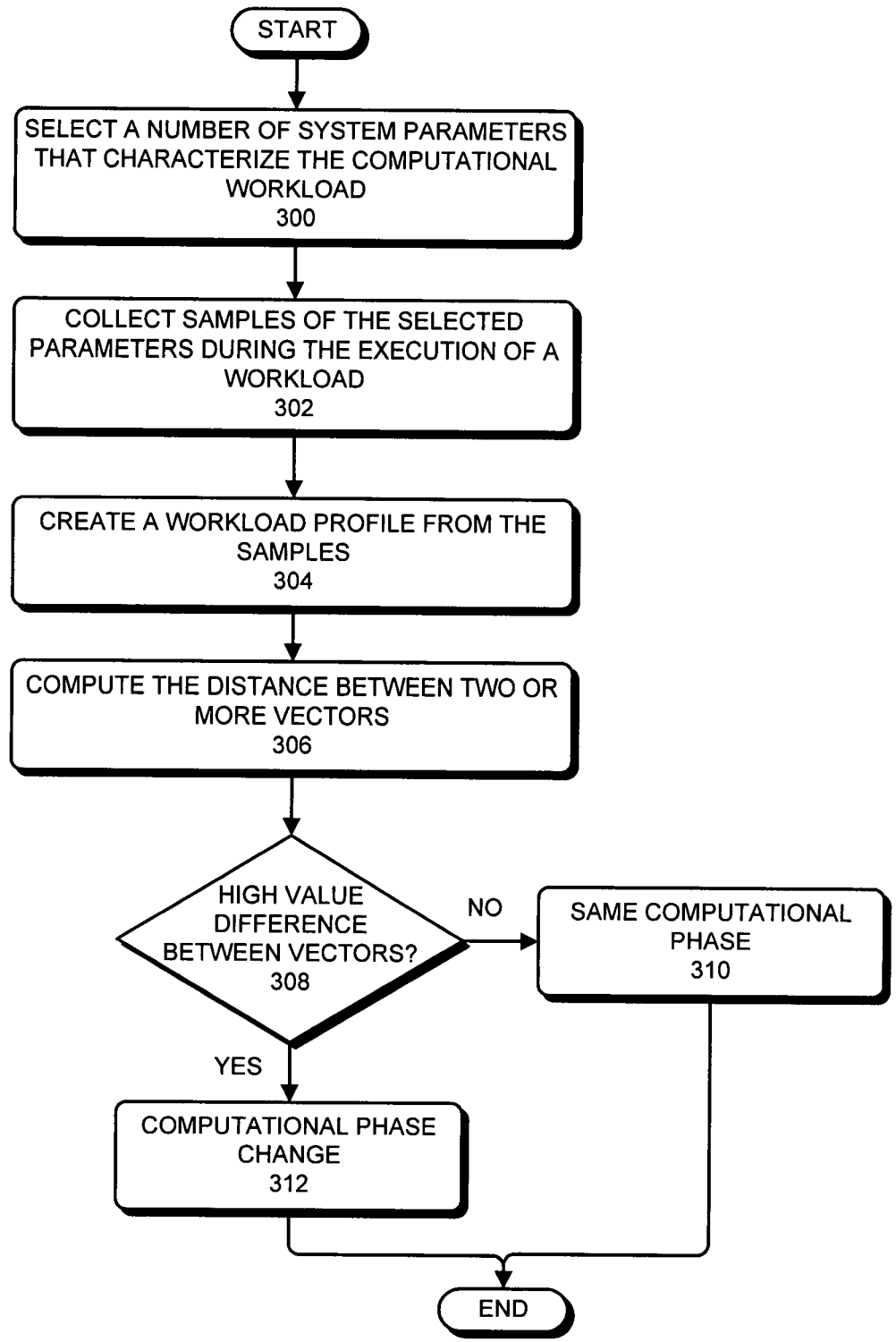
FIG. 3 presents a flowchart illustrating a process of determining computational phases in a computational workload in accordance with an embodiment of the present invention.

FIG. 3 presents a flowchart illustrating the process of determining computational phases in a computational workload in accordance with an embodiment of the present invention. The process starts with the selection of a number of parameters that characterize the computational workload (step 300). These parameters can be: hardware counter-based measurements, derived metrics, OS kernel statistics, etc. For multiprocessor systems, some measurements are system-wide, while others are specific to each of the available processors. In embodiments of the present invention, the computer system automatically selects the parameters that identify the computational workload. In alternative embodiments, a computer system receives the selections from a system designer.

The computer system then collects samples of the selected parameters during the execution of a workload (step 302). These samples are taken at a fixed rate, for example with at intervals of 1 or 10 seconds.

Next, the computer system creates a "workload profile" from the samples (step 304). A workload profile is a series of vectors characterizing the computational workload. Within the workload profile, each vector represents measured values corresponding to a given sample. Note that creating a workload profile can involve normalizing and time-aligning the vectors representing the samples for the selected parameters.

The computer system then computes the distance between two or more vectors (step 306). In embodiments of the present invention, the computer system uses a weighted norm to determine the distance between the vectors. Using the weighted norm allows the computer system to assign a higher contribution to more important characteristics (e.g., the cycles-per-instruction (CPI) rate) among the collected samples. In alternative embodiments, the computer system uses other common vector analysis techniques to determine the distance between the vectors.

The system then determines if the distance between the vectors is high-value (step 308). A low-value distance between the vectors corresponds to samples taken when the computation is in the same phase (step 310); while a high-value distance indicates a phase change (step 312). In embodiments of the present invention, a specific threshold is selected to distinguish phase changes from small fluctuations of sample values within a computational phase.

Determining a Computational Phase Change Using Pattern Matching

Figure 4:
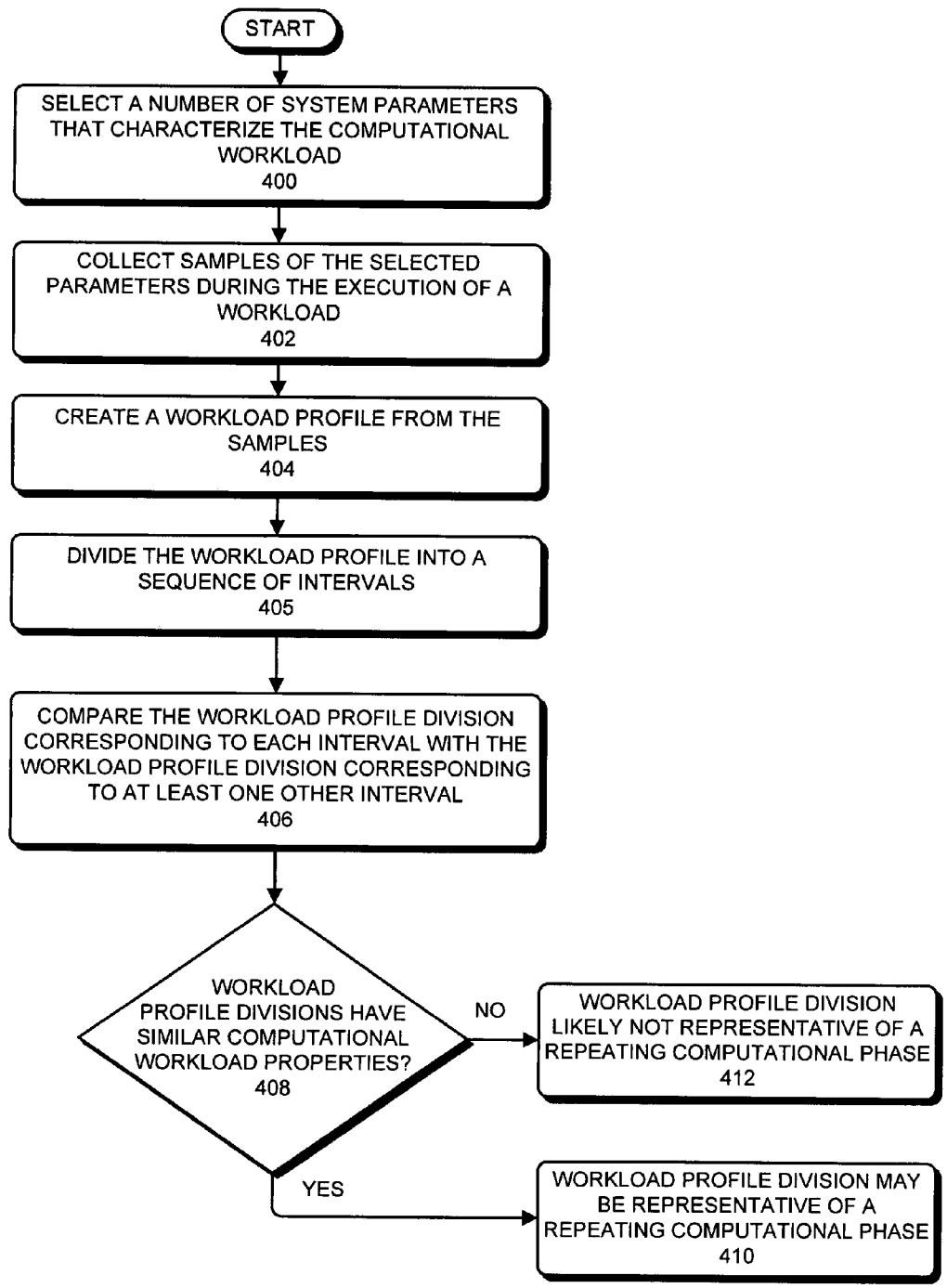
FIG. 4 presents a flowchart illustrating the use of pattern matching to determine computational phases in a computational workload in accordance with an embodiment of the present invention.

FIG. 4 presents a flowchart illustrating the use of pattern matching to determine computational phases in a computational workload in accordance with an embodiment of the present invention. The process starts with the selection of a number of parameters that characterize the computational workload (step 400). In embodiments of the present invention, the computer system automatically selects the parameters that identify the computational workload. In alternative embodiments, a system designer selects the parameters that identify the computational workload.

The computer system then collects samples of the selected parameters during the execution of a workload (step 402). These samples are taken at a fixed rate, for example at intervals of 1 or 10 seconds.

Next, the computer creates a workload profile from the samples (step 404). A workload profile is a series of vectors characterizing the computational workload. Within the workload profile, each vector represents the measured values corresponding to a given sample.

The computer system then divides the workload profile into a sequence of intervals (step 405). For example, the computer system can divide a workload profile that is 24 hours long into a sequence of one-minute, ten-minute, or one-hour intervals.

Next, the computer system compares the workload profile division corresponding to each interval with the workload profile division corresponding to at least one other interval (step 406) to determine if the compared workload profile divisions have similar computational workload patterns.

In embodiments of the present invention, the computer system performs a pattern-matching operation to determine if the computational workload divisions have similar workload patterns. During the pattern-matching process, the computer system may use a Fourier analysis, an auto-correlation analysis, or another type of analysis that compares the computational workload profiles in the workload profile divisions.

If the workload profile divisions have similar computational workload patterns (step 408), the workload profile division may be representative of a repeating computational phase (step 410). Otherwise, the workload profile division is likely not representative of a repeating computational phase (step 412).

Note that the computer system can re-size the interval (i.e., for the workload profile divisions) and can perform the comparison process again if zero or more repeating computational phases are found among the workload profile divisions for a given interval. Hence, if the one-hour interval does not reveal any repeating computational phases, the computer system can try a thirty-minute or ten-minute interval. In this case, a shorter interval may reveal repeating computational phases that were not discernible at the longer interval. On the other hand, if the one-hour interval reveals repeating computational phases, the computer system can try a ten-minute or thirty-minute interval. In this case, a shorter interval may be easier to work with in later steps of the subsequent simulation process (see FIG. 5).

Simulating a Computer System Using Computational Phases

Figure 5:
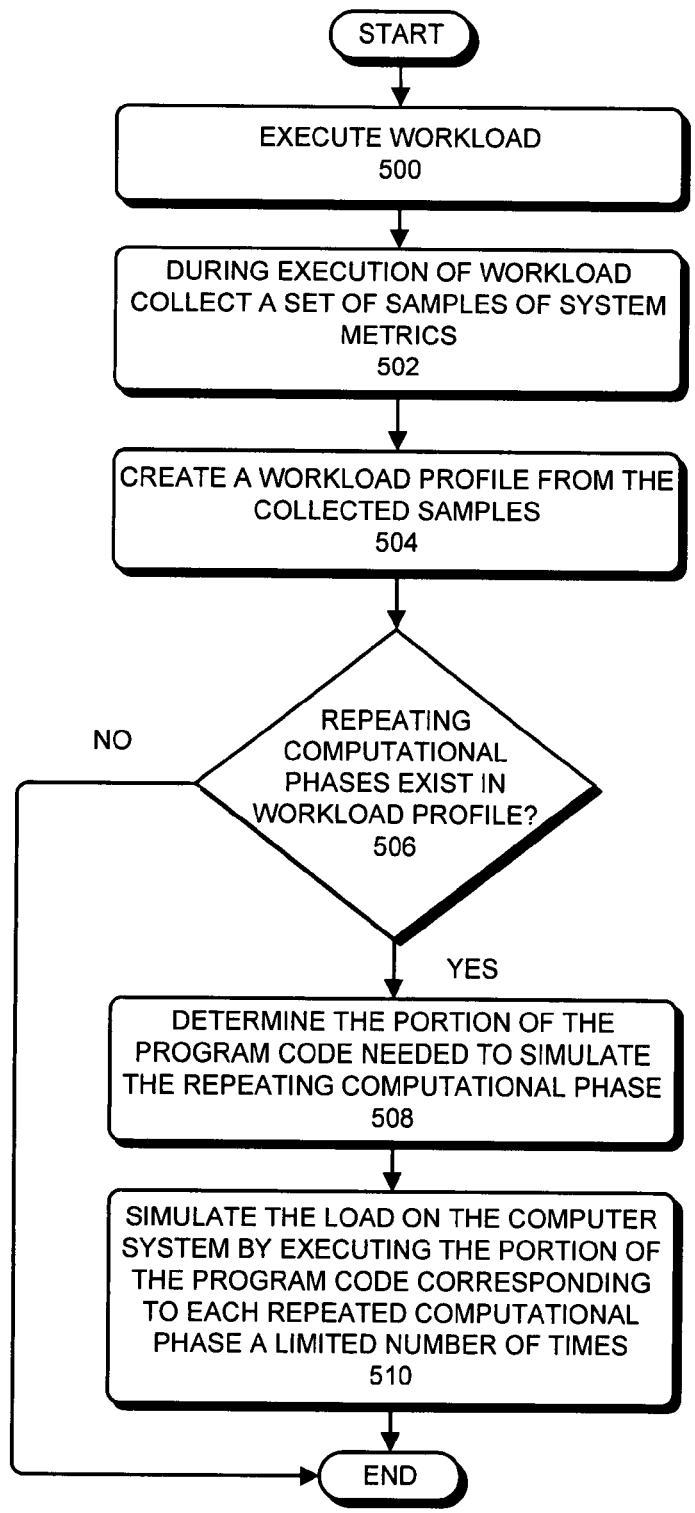
FIG. 5 presents a flowchart illustrating the process of simulating a load on a computer system in accordance with an embodiment of the present invention.

FIG. 5 presents a flowchart illustrating the process of simulating a load on a computer system in accordance with an embodiment of the present invention. The process starts with a computer system executing a workload (step 500). For example, the computer system may be simulating an finite element method problem such as the three-car accident simulation.

During the execution of the workload, a monitoring system 114 collects a set of samples of system metrics (step 502). The computer system then creates a workload profile using the set of collected samples (step 504).

The computer system next determines if one or more repeating computational phases exist within the workload profile (step 506) (as described with respect to FIGS. 3 and 4). If there are no repeating computational phases, the process ends.

Otherwise, if one or more repeating computational phases exists in the workload profile (step 506), the computer system determines the portion of the program code needed to simulate each repeating computational phase (step 508). In one embodiment of the present invention, the computer system makes a record of the program counter of the instruction that is executing as each system metric sample is collected and subsequently uses the recorded program counters to identify a portion of the program code that was executing during a computational phase.

Then, during subsequent simulations, instead of repeatedly executing the program code corresponding to each repeating computational phase, the computer system executes the portion of the program code corresponding to each repeated computational phase a limited number of times (step 510)

(i.e., at least one time). Hence, the load on the computer system is accurately simulated in much less time than is required to run the full program code.

In embodiments of the present invention, some or all of the program code is replaced with the portions of the program code that correspond to the repeating computational phases. For example, assume the program code takes 17 hours to run. Suppose that the program code can be decomposed into 4 major computational phases, which in turn can be decomposed in the following way: (1) phase one is a repeating series of computations that average 6 minutes; (2) in phase two the repeating computations average 12 minutes; (3) in phase three the repeating computations average 9 minutes; and (4) in phase four the repeating computations average 10 minutes. Hence, the load on the computer system while running the program code can be accurately simulated using 4 short-duration computations instead of the entire program code. In this case, using the repeating computations from each computational phase instead of executing the entire program code, the 17-hour runtime can be reduced to (6 min.+12 min.+9 min.+10 min.)=37 mins.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating a load on a computer system, comprising:
    collecting a set of sampled values from one or more monitors in the computer system while the computer system is executing program code, wherein, for each sampled value in the set, collecting the sampled value comprises recording a reference that identifies a portion of the program code that the computer system is executing as the sampled value is collected;
    using the set of sampled values to determine one or more repeating computational phases for the program code that occur while the computer system is executing the program code; and
    simulating the load on the computer system by executing one or more times portions of the program code that caused each repeating computational phase, wherein executing the portions of the program code that caused each repeating computational phase comprises, before executing the portions of the program code, for each repeating computational phase:
        determining a recorded reference in the references that corresponds to the portion of the program code executing during the repeating computational phase; and
        using the recorded reference to generate code that includes instructions from the portions of the program code that caused the repeating computational phase.

2. The method of claim 1, wherein determining the one or more repeating computational phases comprises:
    generating a workload profile from the set of the sampled values, wherein the workload profile includes a sequence of vectors representing a sequence of sampled values from the set of sampled values;
    dividing the workload profile into two or more intervals and comparing each division of the workload profile to at least one other division of the workload profile to determine if the divisions have similar workload patterns, wherein the comparison process involves performing a pattern-matching analysis; and
    wherein if the compared divisions have similar workload patterns, they represent the same computational phase.

3. The method of claim 1, wherein the one or more monitors sample system metrics including:
    a number of instructions executed per second;
    a number of execution cycles per second;
    a traffic on a bus in the computer system;
    a load on a processor;
    a miss-rate in a cache; or
    a system metric that indicates an aspect of computer system performance.

4. The method of claim 3, wherein if no repeating computational phases are found using the set of sampled values, the method further comprises switching the one or more monitors to sample different system metrics.

5. An apparatus for generating a load on a computer system, comprising:
    a processor;
    a collection mechanism configured to collect a set of sampled values from one or more monitors in the computer system while the computer system is executing program code, wherein, while collecting the set of sampled values, the collection mechanism is configured to, for each sampled value in the set, record a reference that identifies a portion of the program code that the computer system is executing as the sampled value is collected;
    a comparison mechanism coupled to the collection mechanism, wherein the comparison mechanism is configured to use the set of sampled values to determine one or more repeating computational phases for the program code that occur while the computer system is executing the program code; and
    a simulation mechanism coupled to the comparison mechanism, wherein the simulation mechanism is configured to simulate the load on the computer system by executing one or more times portions of the program code that caused each repeating computational phase, wherein, while executing the portions of the program code that caused each repeating computational phase, the simulation mechanism is configured to, before executing the portions of the program code, for each repeating computational phase:
        determine a recorded reference in the references that corresponds to the portion of the program code executing during the repeating computational phase; and
        use the recorded reference to generate code that includes instructions from the portions of the program code that caused the repeating computational phase.

6. The apparatus of claim 5, wherein when determining the one or more repeating computational phases the comparison mechanism is configured to:
    generate a workload profile from the set of the sampled values, wherein the workload profile includes a sequence of vectors representing a sequence of sampled values from the set of sampled values;
    divide the workload profile into two or more intervals and compare each division of the workload profile to at least one other division of the workload profile to determine if the divisions have similar workload patterns;
    wherein during the comparison, the comparison mechanism is configured to perform a pattern-matching analysis; and wherein if the compared divisions have similar workload patterns, they represent the same computational phase.

7. The apparatus of claim 5, wherein the one or more monitors sample system metrics including:
   a number of instructions executed per second;
   a number of execution cycles per second;
   a traffic on a bus in the computer system;
   a load on a processor;
   a miss-rate in a cache; or
   a system metric that indicates an aspect of computer system performance.

8. The apparatus of claim 7, wherein if no repeating computational phases are found using the set of sampled values, the collection mechanism is configured to switch the one or more monitors to sample different system metrics.

9. A simulation system for generating a load on a computer system, comprising:
   a collection mechanism configured to collect a set of sampled values from one or more monitors in the computer system while the computer system is executing program code, wherein, while collecting the set of sampled values, the collection mechanism is configured to, for each sampled value in the set, record a reference that identifies a portion of the program code that is executing as the sampled value is collected;
   a comparison mechanism coupled to the collection mechanism, wherein the comparison mechanism is configured to use the set of sampled values to determine one or more repeating computational phases for the program code that occur while the computer system is executing the program code;
   a simulation mechanism coupled to the comparison mechanism, wherein the simulation mechanism is configured to simulate the load on the computer system by executing one or more times portions of the program code that caused each repeating computational phase; and
   a memory coupled to the collection mechanism, the comparison mechanism, and the simulation mechanism, wherein the memory is configured to store data for simulating the load on the computer system.

10. The simulation system of claim 9, wherein when determining if one or more repeating computational phases occurs during the execution of program code, the comparison mechanism is configured to:
    divide the workload profile into two or more intervals and compare each division of the workload profile to at least one other division of the workload profile to determine if the divisions have similar workload patterns;
    wherein during the comparison, the comparison mechanism is configured to perform a pattern-matching analysis; and
    wherein if the compared divisions have similar workload patterns, they represent the same computational phase.

11. The simulation system of claim 9, wherein the simulation system further comprises a monitoring mechanism coupled to the collection mechanism, wherein the monitoring mechanism is configured to determine what portion of the program code is executing as each repeating computational phase occurs.

12. The simulation system of claim 9, wherein the one or more monitors sample system metrics including:
    a number of instructions executed per second;
    a number of execution cycles per second;
    a traffic on a bus in the computer system;
    a load on a processor;
    a miss-rate in a cache; or
    a system metric that indicates an aspect of computer system performance.

13. The simulation system of claim 12, wherein if no repeating computational phases are found using the set of sampled values, the collection mechanism is configured to switch the one or more monitors to sample different system metrics.

14. The method of claim 2, wherein determining the one or more repeating computational phases further comprises:
    comparing a distance between two or more vectors in the sequence of vectors to determine when a repeating computational phase change occurs.

15. The method of claim 1, wherein determining the one or more repeating computational phases comprises using a pattern-matching process to identify patterns in the set of sampled values, wherein each pattern corresponds to a repeating computational phase.

16. The method of claim 1, wherein determining the recorded reference that corresponds to the portion of the program code executing during the repeating computational phase comprises using a sampled value collected during the repeating computational phase to determine the recorded reference.

17. The method of claim 1, wherein executing the portions of the program code that caused each repeating computational phase further comprises executing the generated code to cause the computer system to perform the repeating computational phase.

18. The method of claim 1, wherein executing the portions of the program code that caused each repeating computational phase further comprises executing the generated code instead of executing the program code, wherein executing the generated code causes the computer system to perform the repeating computational phase.

19. The method of claim 2, wherein, if no repeating computational phases are found, the method further comprises re-sizing at least one of the two or more intervals and repeating the comparing each division of the workload profile for the re-sized interval.

20. The method of claim 1, wherein using the recorded reference to generate code comprises determining, from the recorded reference, what portion of the program code is executing as the corresponding repeating computational phase occurs, and
    wherein the recorded reference comprises a program counter for an instruction that is executing as the corresponding repeating computational phase occurs.

21. The simulation system of claim 9, wherein, while executing the portions of the program code that caused each repeating computational phase, the simulation mechanism is configured to, before executing the portions of the program code, for each repeating computational phase:
    determine a recorded reference in the references that corresponds to the portion of the program code executing during the repeating computational phase;
    use the recorded reference to generate code that includes instructions from the portions of the program code that caused the repeating computational phase; and
    execute the portions of the program code that caused each repeating computational phase further comprises executing the generated code to cause the computer system to perform the repeating computational phase.

* * * * *